United States Patent [19]

Sutton

[11] Patent Number: 4,815,432
[45] Date of Patent: Mar. 28, 1989

[54] VARIABLE CAVITY FLUID POWER DEVICE

[76] Inventor: Michael Sutton, 5400 Audrey Rd., Greensboro, N.C. 27406

[21] Appl. No.: 214,854

[22] Filed: Jul. 5, 1988

Related U.S. Application Data

[63] Continuation-in-part of Ser. No. 191,760, May 3, 1988, abandoned, which is a continuation of Ser. No. 64,381, Jun. 22, 1987, abandoned.

[51] Int. Cl.[4] .................. F02B 53/12; F02B 55/14; F01C 3/06
[52] U.S. Cl. .................. 123/241; 418/68; 418/143; 418/195
[58] Field of Search .............. 418/68, 195, 143; 123/241

[56] References Cited

U.S. PATENT DOCUMENTS

| 1,880,131 | 9/1932 | Gray | 418/68 |
| 2,043,544 | 6/1936 | Kempthorne | 123/241 |
| 2,173,663 | 9/1939 | Raymond | 123/241 |

FOREIGN PATENT DOCUMENTS

| 571920 | 2/1924 | France | 418/68 |
| 911618 | 3/1946 | France | 418/195 |
| 45-14470 | 5/1970 | Japan | 418/195 |
| 2052639 | 1/1981 | United Kingdom | 418/195 |

Primary Examiner—John J. Vrablik

[57] ABSTRACT

A piston rotor and a chamber partitioning rotor are continuously rotated unidirectionally about fixed rotational axes intersecting at an acute angle within a spherical chamber enclosed by a housing. Simultaneous rotation of the rotors and relative angular movement therebetween occurs because of a pivotal joint interconnecting such rotors at the intersection of the rotational axes coinciding with the geometric center of the spherical chamber. Pressure cavities formed between the rotors within the spherical chamber are volumetrically varied in response to the relative movement of the rotors. For internal combustion engine operation, port controlling dome segments within the chamber are rotated at a reduction drive ratio to the chamber partitioning rotor through planetary gearing.

20 Claims, 8 Drawing Sheets

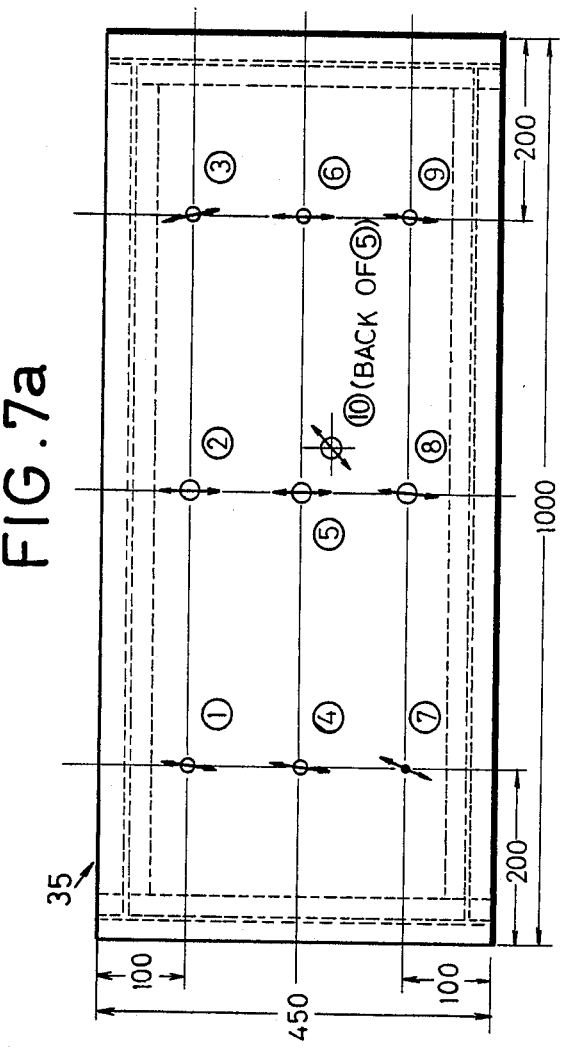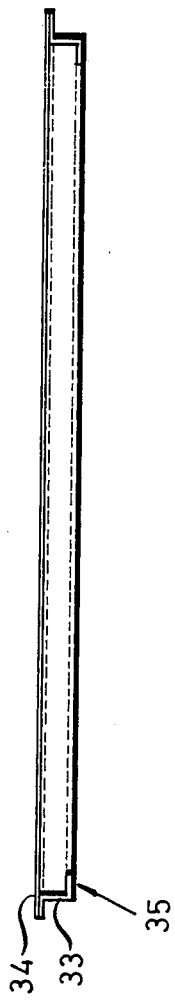

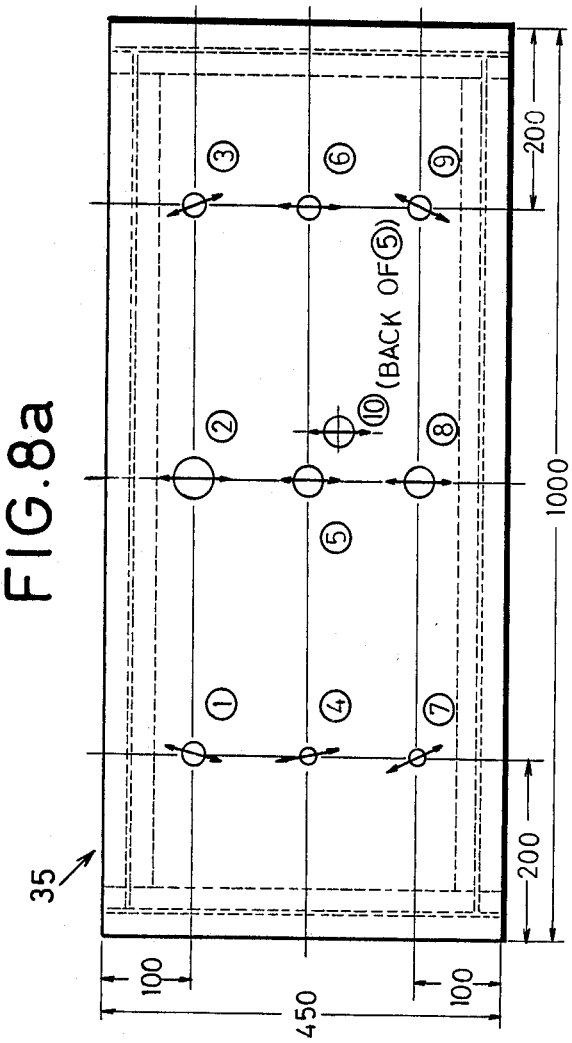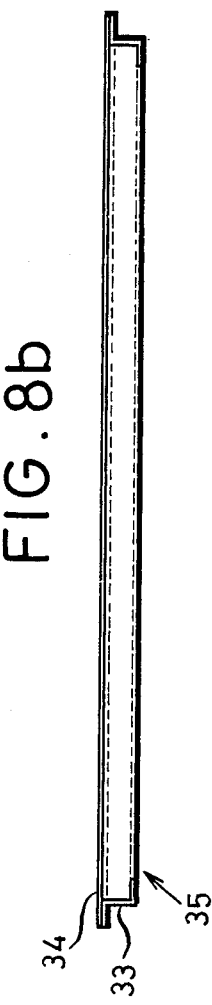

VARIABLE CAVITY FLUID POWER DEVICE

This is a continuation-in-part of application Ser. No. 191,760 filed May 3, 1988, now abandoned which is a continuation of Ser. No. 07/064,381 filed June 22, 1987, also now abandoned.

BACKGROUND OF THE INVENTION

This invention relates generally to fluid displacement devices such as pumps, compressors, fluid motors and internal combustion engines.

Fluid displacing devices having pressure cavities volumetrically varied by piston rotors within spherical chambers are already known, as disclosed for example in U.S. Pat. Nos. 3,973,469; 4,021,158; 4,036,566 and 4,371,320. According to such prior patented devices, the pressure cavities are volumetrically varied by relative rotor rotation about an axis extending through the geometric center of the spherical chamber. According to some of such patents, the piston rotor is rotated relative to a stationary chamber partition. According to other of such patents, two piston rotors are rotated relative to each other about angularly related drive shafts. In the case of the device disclosed in U.S. Pat. No. 4,021,158 to Bajulaz for example, gearing disposed eternally of the chamber drivingly interconnects the rotor drive shafts. The piston rotors are otherwise independent of each other.

For various reasons, the aforementioned types of spherical chamber, fluid piston displacing devices have not enjoyed any significant degree of commercial success. It is therefore an important object of the present invention to provide a spherical chamber type of fluid displacing device which operates in a somewhat different manner than those heretofore known to thereby avoid the problems and drawbacks associated therewith and provide greater efficiency and operational reliability.

SUMMARY OF THE INVENTION

In accordance with the present invention, the fluid displacing device has two rotors mounted by a housing for rotation about fixed axes which intersect at an acute angle to each other, such as 60°. One of the rotors has piston bodies interconnected by an annular bearing portion for rotation within a spherical chamber of the housing. The other of the rotors is in the form of a generally circular disc extending diametrically within the spherical chamber to partition the same into two generally hemispherical sections. A power shaft is connected to the chamber partitioning rotor and is journaled by the housing to establish a fixed axis. The axis for the piston rotor, on the other hand, is fixedly established by the annular bearing portion of the rotor which is of conical cross-section supported by roller bearings in the housing, according to one embodiment of the invention. The housing is provided with ports through which fluent material enters and is discharged.

The fluent material, whether it be liquid, vaporized fuel, fluids or exhaust products, occupy volumetrically variable pressure cavities formed within the spherical chamber between the piston and chamber partitioning rotors. According to one embodiment of the invention, two of such cavities are formed on each side of the chamber partitioning rotor aforementioned. The cavities are volumetrically varied as a result of the relative movement between the rotors that occurs during simultaneous rotation. The rotors are rotated unidirectionally and continuously in order to effect cyclic volumetric variation of such cavities. Rotational torque is imparted to or derived from the chamber partitioning rotor through its power shaft. A pivotal joint connection between the rotors constrains them to relative rotation because of the angular relationship between the fixed rotor axes which intersect at the geometric center of the chamber. The pivotal joint connection is established within the spherical chamber at the geometric center by means of a pivot bearing fixed to the chamber partitioning rotor and a diametrically elongated pivot member journaled within the piston rotor to establish movable pivot axes which intersect at right angles to each other at the geometric center. As a result of the foregoing arrangement, cyclic oscillation of the rotors relative to each other occurs with respect to different planes during simultaneous rotation of both rotors unidirectionally and continuously. By means of the piston bodies of the piston rotor, the pressure cavities are cyclically varied by a predetermined amount between minimum and maximum volumes for compression and expansion of fluent material, in connection with either a pumping action or internal combustion engine operation.

In order to accommodate internal combustion engine operation, the pressure cavities are ported through chordal dome segments through which the power shaft extends at opposite axial ends of the chamber partitioning rotor. Accordingly, the port controlling, chordal dome segments are rotated relative to the piston rotor about the axis of the chamber partitioning rotor by means of geared driving connections to the chamber partitioning rotor. In accordance with one embodiment of the invention, the gear connection is established by a planetary gear arrangement in which face gears secured to the housing and the chamber partitioning rotor mesh with planet pinions journaled by the port controlling dome segments acting as planet carriers. The dome segments are thereby driven at a reduction drive ratio to the power shaft. The chamber partitioning disc rotor may also mount ignition spark plugs and distributor contacts in connection with an internal combustion engine installation.

BRIEF DESCRIPTION OF DRAWING FIGURES

The foregoing objects, features and advantages of the invention, as well as others, will become apparent from the following detailed description given by way of example to be read in connection with the accompanying drawings, wherein.

Figure 3:
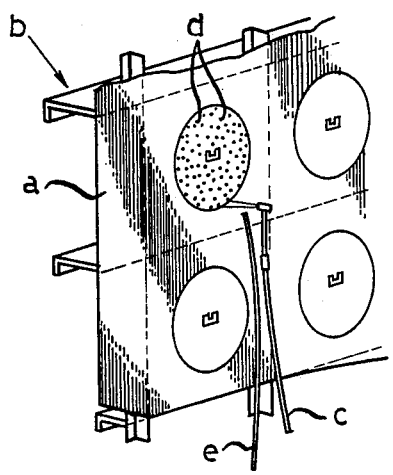
FIG. 3 is a side section view taken substantially through a plane indicated by section line 3—3 in FIG. 2.
Figure 10:
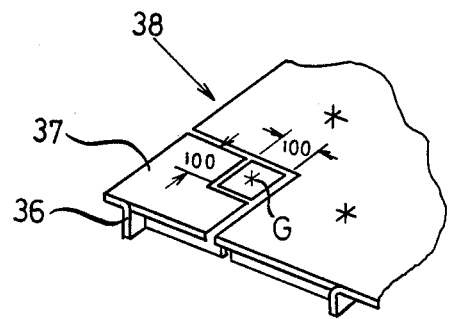
Figure 11:
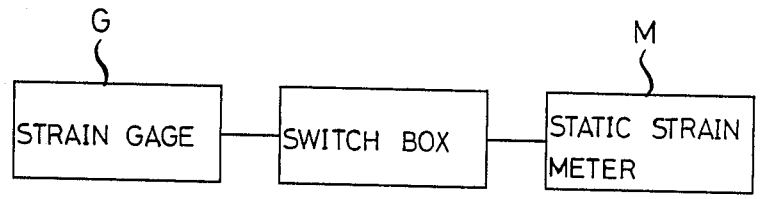
Figure 1:
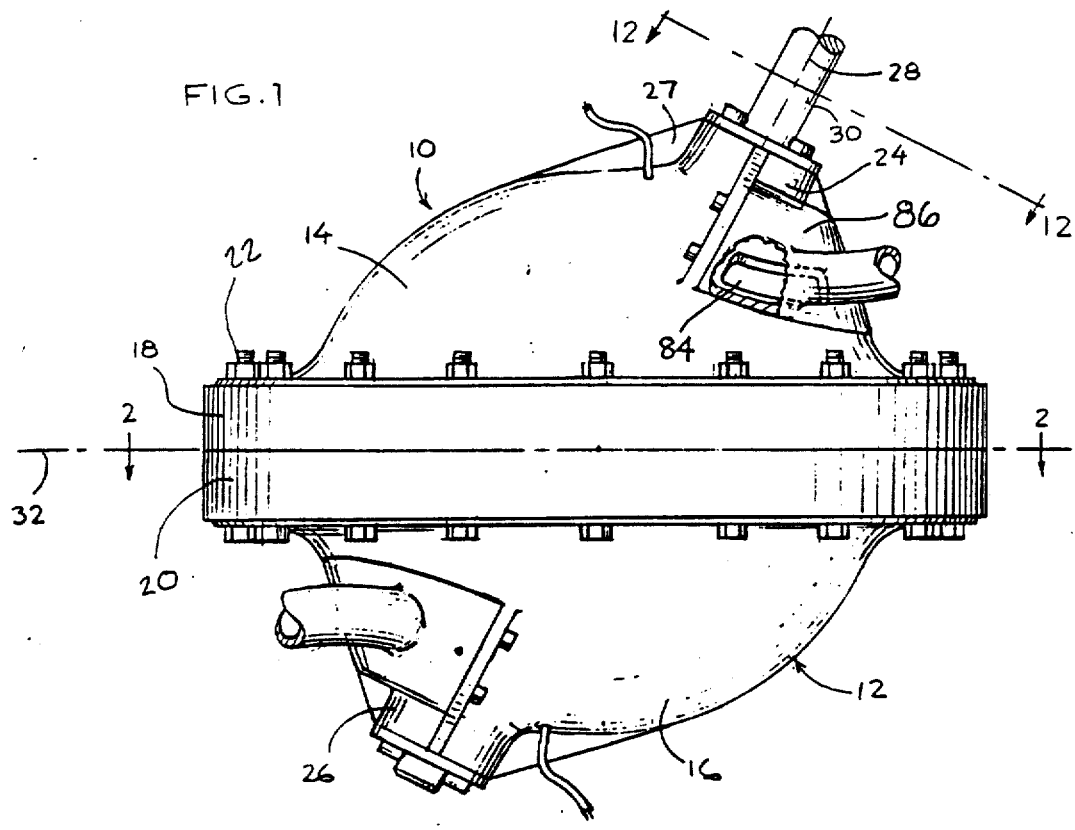
Figure 4:
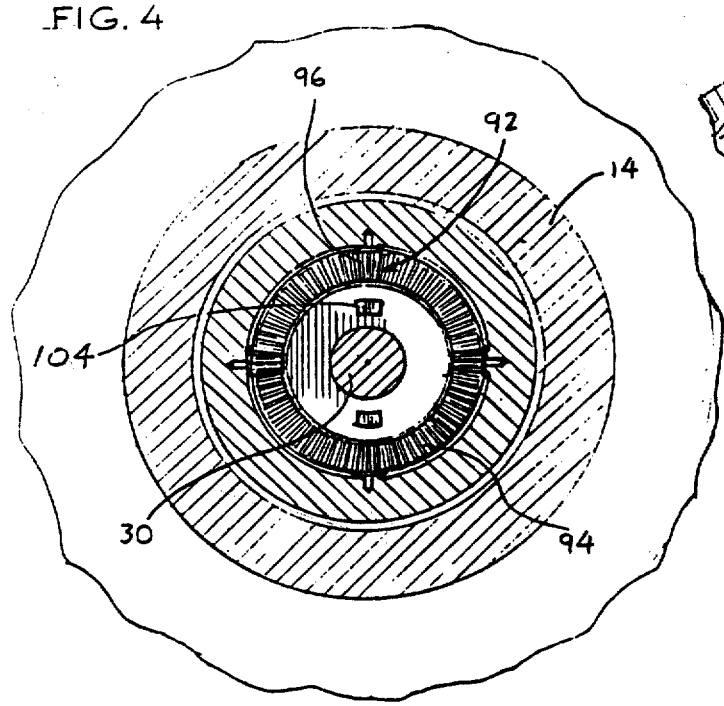
Figure 5:
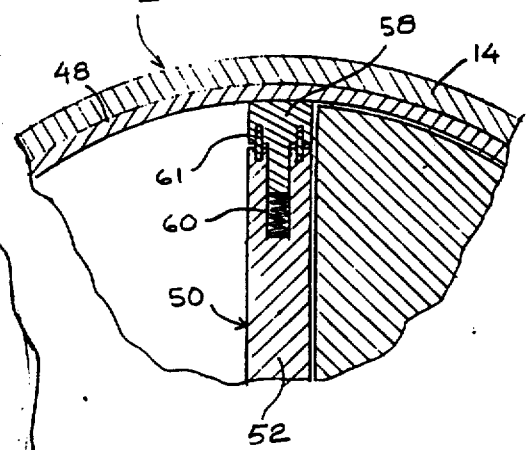
Figure 2:
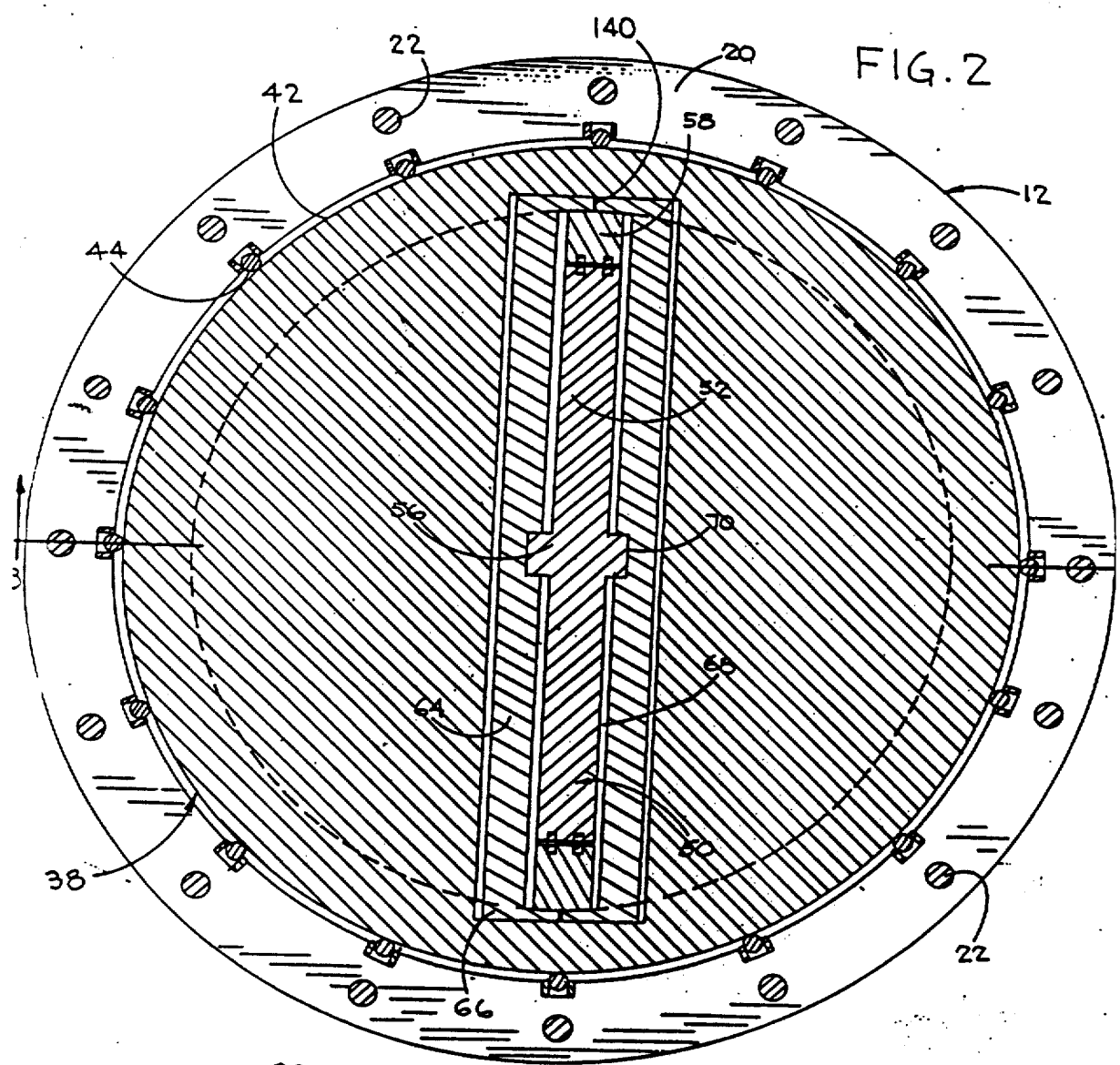
Figure 6:
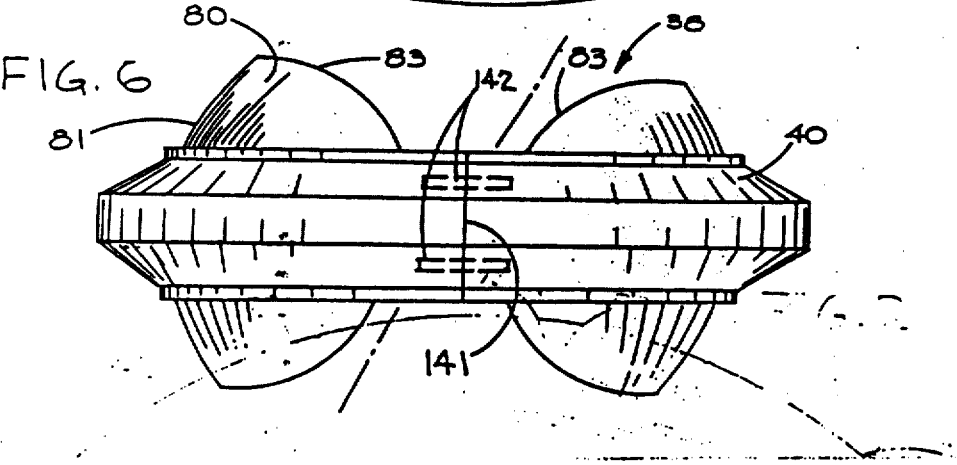
Figure 3:
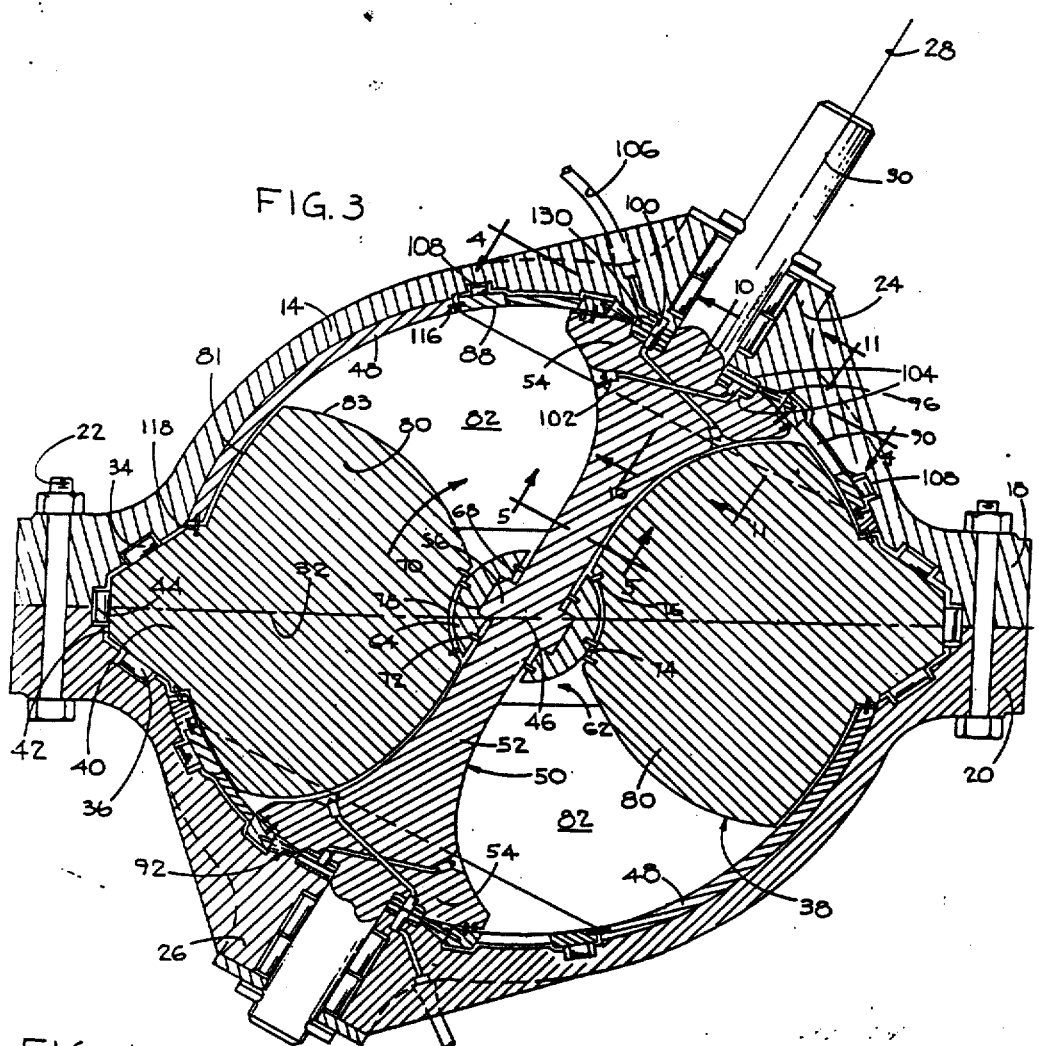
Figure 10:
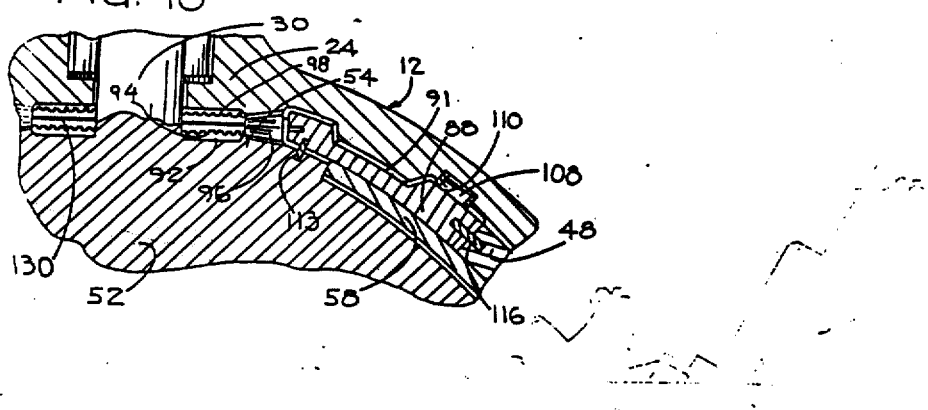
Figure 11:
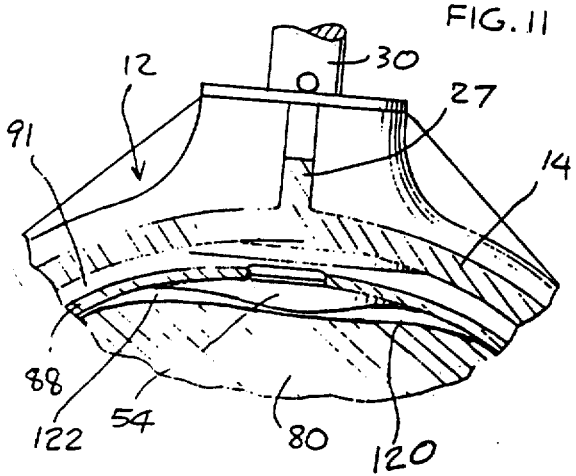

FIGS. 10 and 11 are enlarged, partial section views taken substantially through planes indicated by section lines 10—10 and 11—11 in FIG. 3.

Figure 1:
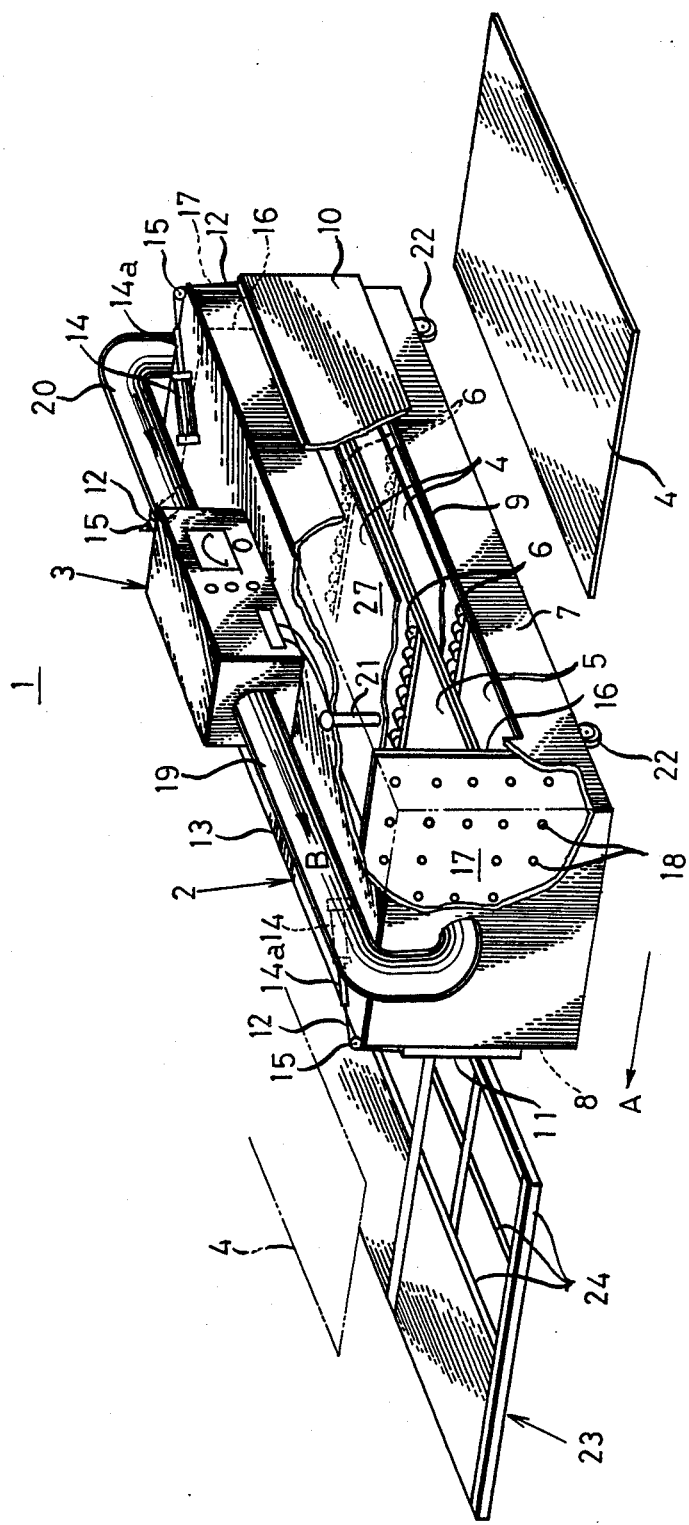
FIG. 1 is a side elevation view of a fluid displacing device constructed in accordance with one embodiment of the present invention.

FIG. 12 is a partial top section view taken substantially through a plane indicated by section line 12—12 in FIG. 1.

Figure 13:
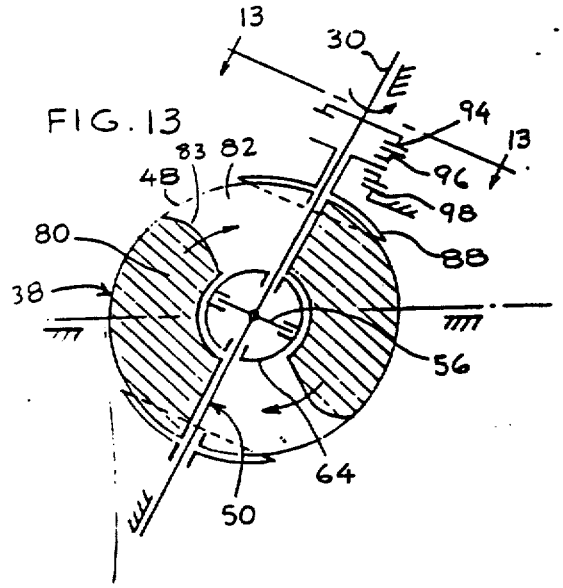

FIG. 13 is a kinematic representation of the device shown in FIGS. 1-5 corresponding to the side section view of FIG. 3.

Figure 14:
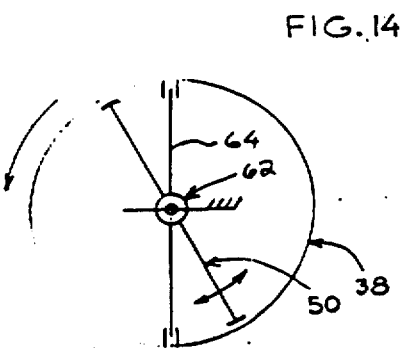

FIG. 14 is a kinematic representation of the device as viewed from a plane indicated by section line 14—14 in FIG. 13.

DETAILED DESCRIPTION OF THE PREFERRED EMBODIMENT

Referring now to the drawings in detail, FIG. 1 illustrates a fluid displacing device constructed in accordance with one embodiment of the present invention, generally referred to by reference numeral 10. In the illustrated embodiment, the device 10 is arranged to operate as an internal combustion engine as will be explained in detail hereinafter.

The fluid displacing device 10 may be suitably secured to some installational frame by means of its housing generally referred to by reference numeral 12 in the illustrated embodiment. The housing is formed by two generally hemispherical sections 14 and 16 having abutting annular flanges 18 and 20 interconnected in circumferentially spaced relationship by a plurality of bolt assemblies 22. The housing sections 14 and 16 are respectively provided with axially aligned, shaft journaling formations 24 and 26 projecting radially of the housing to establish a fixed drive axis 28 with which a power shaft or drive axle 30 is aligned. Reinforcing ribs 27 also project from the housing in angularly spaced relation to the shaft journalling formations.

The fixed drive axis 28 intersects a second axis 32 also fixed to the housing in the abutment plane between the housing flanges 18 and 20. The axis 32 is established by circumferentially spaced roller bearings 34 and 36 respectively carried by the housing sections 14 and 16 adjacent to the flanges 18 and 20 for rotational support of a piston rotor assembly 38 as more clearly seen in FIG. 3. The roller bearings 34 and 36 are seated on confronting cross-sectionally conical surfaces of the housing sections 14 and 16 for bearing contact with a cross-sectionally conical, annular bearing portion 40 of the rotor assembly 38 extending circumferentially thereof as more clearly seen in FIGS. 6 and 7. The radially outer peripheral surface 42 of the bearing portion 40 is in bearing contact with roller bearings 44 carried within mating recesses formed in the flanges 18 and 20 of the housing sections, as more clearly seen in FIGS. 2 and 3. The arrangement of roller bearings 34, 36 and 44 accordingly establishes the fixed rotational axis 32 for the rotor assembly 38 which intersects the drive axis 28 of the power shaft 30 at 46 as shown in FIG. 3. The intersection 46 also forms the geometrical center of a spherical chamber enclosed by chamber liners 48 fixed to the housing sections. Further, the drive axis 28 intersects the rotational axis 32 of rotor assembly 38 at an acute angle, such as 60°. The drive axis 28 also constitutes the rotational axis of a chamber partitioning rotor assembly 50 to which the power shaft 30 is connected.

Figure 8:
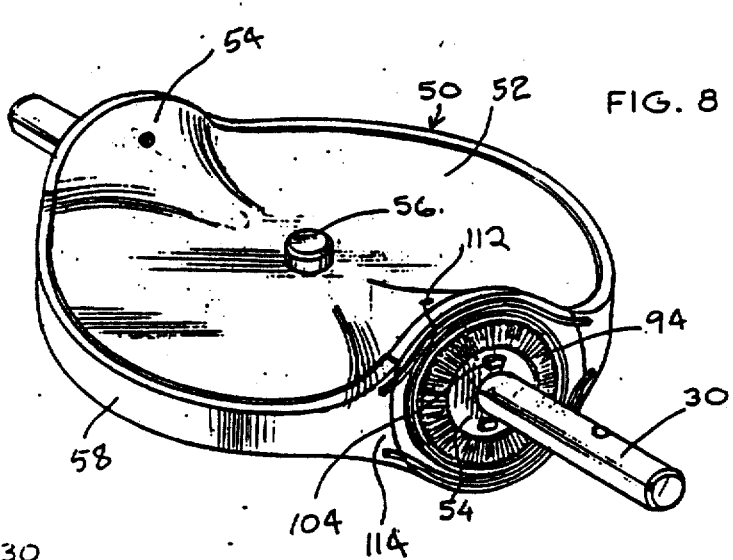
FIG. 8 is a perspective view of the dissembled chamber partitioning rotor associated with the device shown in FIGS. 1-5.

As more clearly seen in FIG. 8, the rotor assembly 50 has a substantially circular disc body 52 with a periphery conforming to the internal spherical chamber surface of the housing. At diametrically opposite locations on the rotor assembly 50, the disc body flares outwardly into enlarged portions 54 from which the power shaft 30 extends. Pivot bearing formations 56 project axially from the center of the rotor assembly 50 to establish a pivot axis movable with the rotor assembly 50 as it rotates about its rotational drive axis 28.

Figure 2:
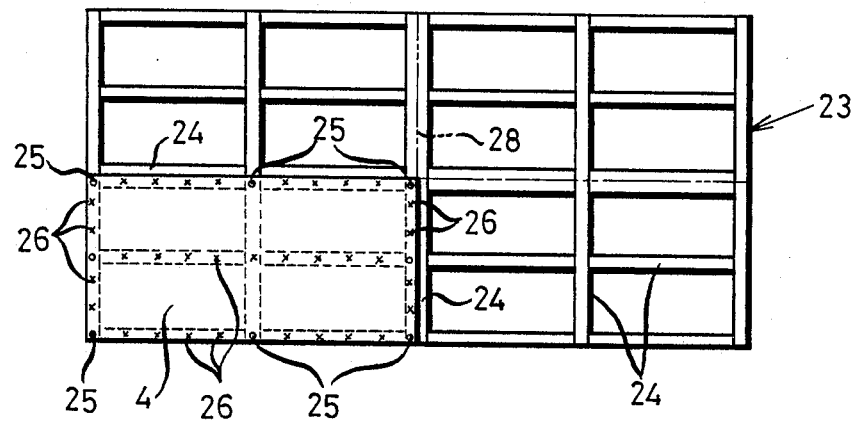
FIG. 2 is an enlarged top section view taken substantially through a plane indicated by section line 2—2 in FIG. 1.
Figure 6:
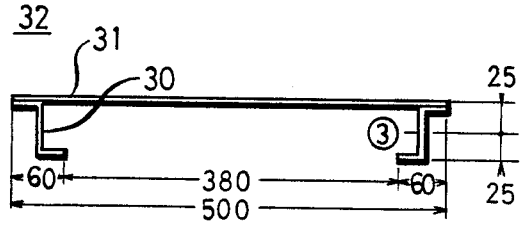
FIG. 6 is a side elevation view of the piston rotor associated with the device shown in FIGS. 1-5.
Figure 7:
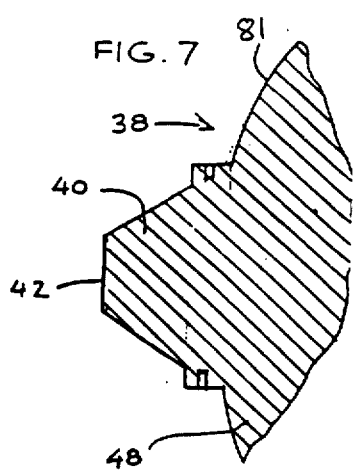
FIG. 7 is a partial section view taken substantially through a plane indicated by section line 7—7 in FIG. 6.

Shown in FIG. 2, assembly points 140 are shown on ends of pivot member 64 whereby welding or other methods could be used to assemble pivot member 64. Also, rotor assembly 38 could be formed in two halves and assembled along lines 141 with pin inserts 142 as shown in FIG. 6. Other means and devices for assembly may be employed and it should be understood that each side of rotor assembly 38 would include a pair of assembly pins 142 as shown in FIG. 6.

Figure 5:
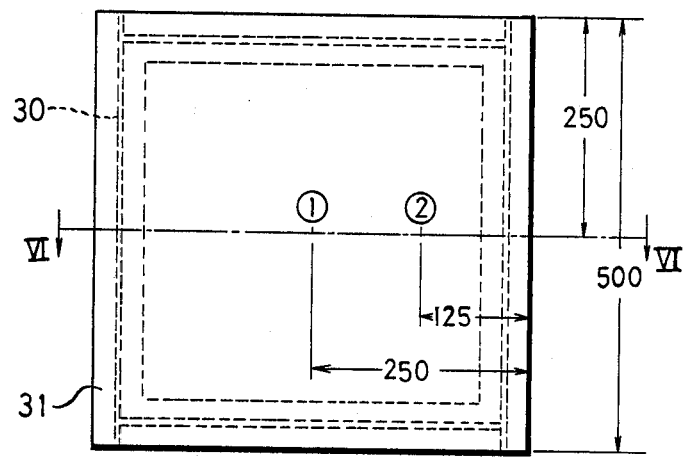
FIG. 5 is a partial section view taken substantially through a plane indicated by section line 5—5 in FIG. 3.

As shown in FIGS. 5 and 8, the periphery of the rotor assembly 50 between the diametrically opposite enlarged portions 54 is provided with a pair of chamber surface guide elements 58 which are biased radially outwardly from the rotor assembly 50 by springs 60. Sealing elements 61 are disposed between the guide elements 58 and the body 52 of the rotor assembly 50 as shown in FIG. 5 in order to maintain opposite sides of the rotor assembly 50 within the spherical chamber in substantially sealed relationship to each other.

The rotor assemblies 50 and 38 are pivotally interconnected with each other by means of a pivotal joint 62 formed by the pivot bearing formations 56 on the rotor assembly 50 and an axially elongated, cylindrical pivot member 64 as more clearly seen in FIGS. 2 and 3. The pivot member 64 extends diametrically through the spherical chamber of the housing and is journaled at its opposite axial ends 66 therein to establish a pivot axis movable with rotor assembly 38 at right angles to the movable pivot axis extending through the pivot bearing formations 56 of the rotor assembly 50. The movable pivot axes intersect at right angles to each at the geometric center 46 of the spherical chamber. A slot 68 is formed in the pivot member 64 in order to receive the body 52 of the rotor assembly 50 therethrough with the pivot bearing formations 56 being received within pivot journaling recesses 70. The slot 68 as more clearly seen in FIG. 3 is provided on opposite sides of the pivot bearing formations 56 with axially extending seals 72. Seals 74 and 76 are also mounted respectively on the cylindrical surface of the pivot member 64 and on internal cylindrical surfaces 78 of piston bodies 80 associated with the rotor assembly 38, which partially occupy and volumetrically limit the spherical chamber enclosed by the housing on opposite sides of the chamber partitioning rotor assembly 50. The piston bodies 80 have external spherical surfaces 81 on opposite sides of the annular bearing portion 40 of rotor 38 and piston surfaces 83 confronting each other as more clearly seen in FIG. 6.

As a result of the pivotal joint 62 formed between the rotor assemblies 50 and 38 by the pivot bearings 56 and pivot member 64, both rotor assemblies will rotate simultaneously. However, because of the angular relationship between the fixed rotational axes 28 and 32 of the rotor assemblies, relative rotation between rotor assemblies will occur in different planes so as to cause volumetric variation of opposed pressure sealed cavities 82 formed within each of the hemispherical sections into which the spherical chamber is divided by the chamber partitioning rotor 50. The relative movement between the rotor assemblies will thus cause the piston bodies 80 to oscillate between end stroke positions substantially abutting the rotor 50 in order to volumetrically contract and expand the cavities 82 on opposite sides thereof, two of the cavities being shown in their fully contracted condition in FIG. 3 at end stroke positions of the piston bodies 80. FIGS. 13 and 14 kinematically illustrate the foregoing arrangement as described.

Figure 9A:
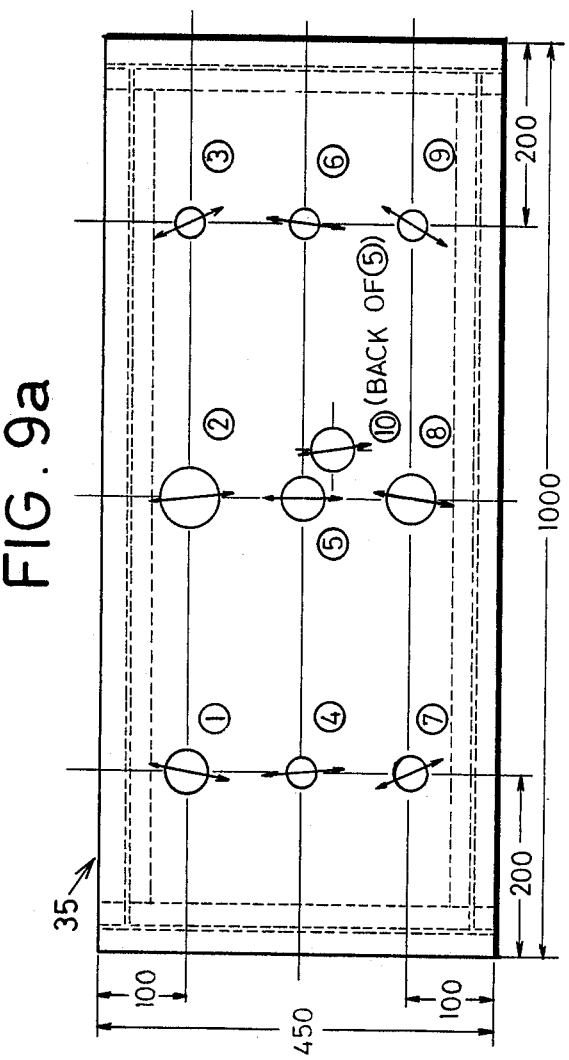
FIG. 9 is a perspective view of a disssembled port controlling dome segment associated with the device shown in FIGS. 1-5.
Figure 9B:
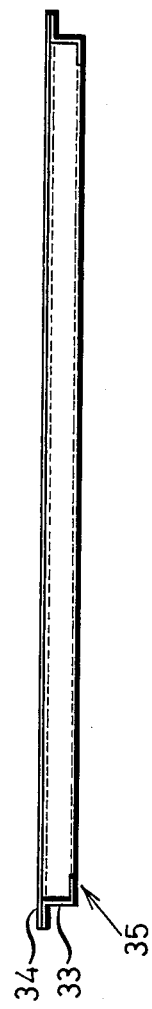

It will be apparent from the foregoing description that the cavities 82 are volumetrically expanded and contracted as a result of simultaneous rotation of the rotor assemblies. Accordingly, the pressure cavities 82 when expanding will draw fluid thereinto and will discharge fluid therefrom when contracting. Ports 84 are accordingly formed in the housing sections 14 and 16 between ribs 27 through which the fluid may be received or discharged as shown in FIG. 1. In connection with use of the fluid displacing device as an internal combustion engine, fuel will be injected and combustion products discharged through such ports. Appropriate manifolds 86 may therefore be attached to the housing by means of the ribs 27 as shown in FIGS. 1 and 12. Also, cyclic control of the opening and closing of the ports must be provided for. Toward that end, chordal portions of the spherical chamber are enclosed by separate port controlling dome segments 88 as more clearly seen in FIGS. 3 and 9. A pair of flow ports 90 are formed in each dome segment in 90° angular relationship to each other relative to the rotor drive axis 28 for cyclic alignment with the housing ports 84 in order to accommodate a four-cycle engine operation. The flow ports 90 are located within an annular recess 91 formed in the dome segment in adjacent spaced relation to its central opening 93 through which the enlarged portion 54 of the rotor assembly 50 is exposed. The port controlling dome segments 88 are rotated in sealed bearing relation to the spherical chamber wall at a reduction drive ratio to the rotor assembly 50 by means of planetary gearing generally referred to by reference numeral 92. As shown in FIGS. 3 and 10, the gearing 92 includes an annular face gear formation 94 on the enlarged portion 54 of the rotor assembly 50 in mesh with planet pinions 96 rotatably mounted by the port controlling dome segment 88 acting as a planet gear carrier. The planet pinions 96 also mesh with reaction face gear formations 98 on the housing sections 14 and 16 in concentric relationship to the power shaft 30 and the rotational drive axis 28. As a result of such gearing, the port controlling dome segments 88 will be rotated at ½ the speed of the power shaft 30. Such planetary gear arrangement is also schematically illustrated in FIG. 13.

Thus, port 90 when rotated to coincidental relation with port 84 will discharge combustion products therethrough when cavity 82 is volumetrically contracted as a result of the simultaneous rotation of rotor assemblies 50 and 38. As seen in FIG. 3 port 90 is between external ports 84 during its rotational cycle and as would be understood the upper and lower hemispheres operate in the same manner in fixed relation to each other.

Figure 4:
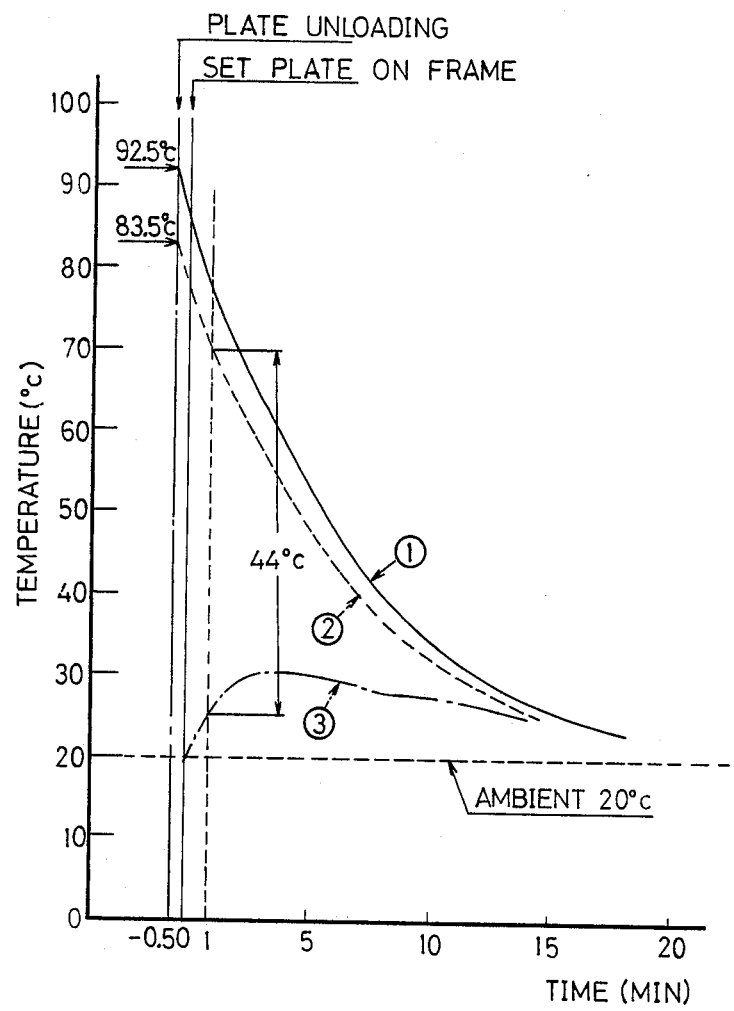
FIG. 4 is a transverse section view taken substantially through a plane indicated by section line 4—4 in FIG. 3.

Combustible fuel is drawn into cavity 82 through the first encountered port 84 during rotation and volumetric expansion of cavity 82. Upon further rotation of rotor assemblies 50 and 38 compression will occur until firing of spark plug 102 which is joined to a suitable distributor (not shown). The ignition of the combustible fuel will in turn cause a further rotation of rotor assemblies 50 and 38 and port 90 will rotate to coincidental relation with the next encountered port 845 for discharge of the combustion products. As seen in FIG. 4, gearing 92 provides dome segments 88 and flow ports 90 (FIG. 3) with a rotational speed of ½ that of power shaft 30.

As also shown in FIG. 3, the enlarged portions 54 of the rotor assembly 50 may mount a pair of ignition spark plugs 102 electrically connected through distributor contacts 104 and a wiping contactor 100 to a source of electrical power through electrical cable 106. Optional ignition disks 130 and 133 seen in FIG. 3 consist of thin, flat metal rings. Disk 130 rotates at the same speed as port done 86 and is attached thereto. Disk 130 provides electrical conduction to spark plugs 102 from wiping contactor 100 as seen in FIGS. 3 and 10. Disk 130 is only partially conductive, for example for less than 180°, since during rotation it serves to accommodate ignition during the combustion cycles. As a result of the flow controlling action of the dome segments 88 and the ignition control action of the distributor contacts 104 in timed relation thereto, internal combustion engine operation may be supported in a manner well known to those skilled in the art.

As shown in FIGS. 3 and 10, each dome segment 88 is supported for rotation in the housing sections by roller bearings 108 in bearing contact with an annular bearing race 110 formed in the dome segment adjacent its radially outer periphery. In order to seal the pressure cavity 82, a pair of arcuate sealing elements 112 extend from the enlarged portion 54 of the rotor body 52 into wiping engagement with the dome segment 88 while a double entry circular sealing element 113 encircles the gear formation 94 and extends into the dome element. The sealing elements 112 are interconnected at their ends with flared end portions 114 of the rotor guides 58 as shown in FIG. 8. Such flared end portions 114 are dimensioned to cover the port openings 90. The radially outer periphery of each dome segment is provided with a wiping seal element 116 for engagement with a chamber liner 48 as more clearly seen in FIG. 10. The liners 48 are also in engagement with wiping seals 118 on the rotor bodies 80 adjacent the annular bearing portion 40 of the rotor assembly 38 as shown in FIG. 3.

In the end stroke positions of the rotor piston bodies 80, each of the piston bodies has one of its opposed piston surfaces 83 in substantial abutment with the chamber partitioning rotor 50 as shown in FIG. 3. The piston surface 83 is made to conform as close as possible to the rotor body 52 and its enlarged portion 54 so as to provide maximum volumetric contraction of the pressure cavities. However, because of the relative rotation between the piston rotor bodies 80 and the rotor body 52, each piston surface 83 must be cut away at 120 as shown in FIG. 11 to avoid relative rotational interference, leaving small clearance gaps 122 in the fully contracted condition of the pressure cavities.

It should be understood that various changes and modifications may be resorted to without departing from the spirit and scope of the invention as defined in the appended claims.

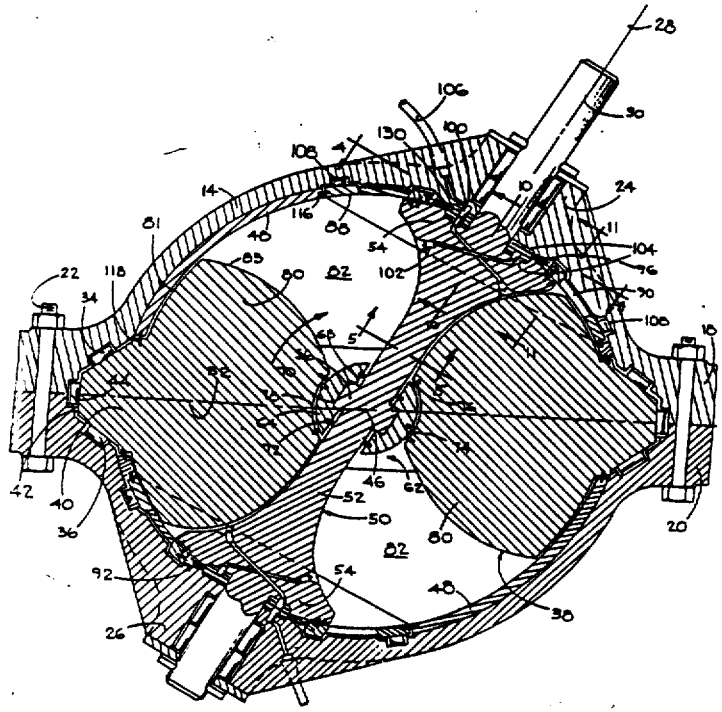

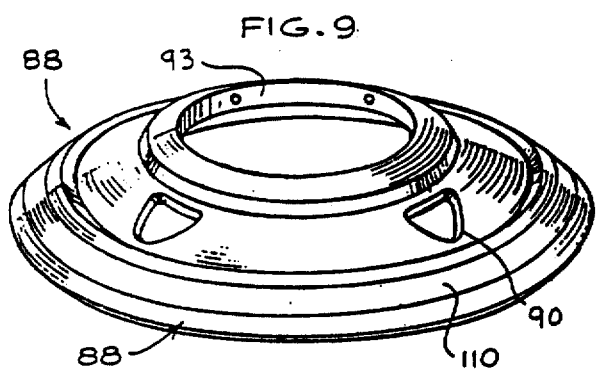
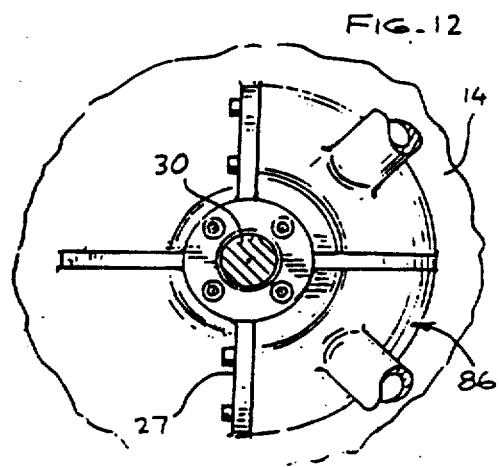

What is claimed is:

1. In a fluid displacing device, a housing enclosing a spherical chamber having a geometric center, a power shaft rotatably mounted by the housing about a fixed drive axis, a rotor, means rotatably mounting the rotor in the housing about a fixed axis at an acute angle thereto on said geometric center, partitioning means fixed to said power shaft for dividing the spherical chamber into pressure cavities, pivotable joint means operatively interconnecting the rotor and the power shaft for constraining relative movement therebetween during rotation of the power shaft, and piston means fixed to the rotor for varying said cavities in volume by a predetermined amount in response to said relative movement of the rotor and the partitioning means, port control means, said port control means rotatably mounted about said drive axis in enclosing relation to chordal segments of the spherical chamber for controlling flow of fluent materials to and from said cavities during said rotation of the power shaft, and ignition means, said ignition means mounted on said partitioning means for igniting fluent materials within said cavities.

2. The combination of claim 1 and including an electrical conductor, said conductor joined to said ignition means, and a wiping contactor, said contactor affixed to the housing.

3. The combination of claim 1 including gear means drivingly connecting the power shaft to the port control means for rotation thereof at a reduction drive ratio to the power shaft.

4. The combination of claim 3 wherein said pivotal joint means includes a pivot member rotatably mounted by the rotor within the spherical chamber about a first moveable pivot axis, said pivot member having a slot through which the partitioning means extends and pivot bearing means pivotally connecting the partitioning means to the pivot member about a second movable pivot axis perpendicular to and intersecting the first pivot axis at said geometric center of the spherical chamber.

5. The combination of claim 4 wherein said piston means includes piston bodies displacable with the rotor relative to the partitioning means through predetermined strokes between end positions substantially abutting the partitioning means.

6. The combination of claim 5 wherein said partitioning means comprises a generally circular disc body to which the power shaft is connected and guide means peripherally mounted on the disc body for wiping engagement with the housing dividing the spherical chamber into hemispherical sections within which the cavities are formed.

7. The combination of claim 6 wherein said rotor includes a circumferential bearing portion journaled in the housing about said fixed diametrical axis, said pivot member being journaled about said first pivot axis and said piston bodies secured to the annular bearing portion.

8. The combination of claim 1 wherein said pivotal joint means includes a pivot member rotatably mounted by the rotor within the spherical chamber about a first movable pivot axis, said pivot member having a slot through which the partitioning means extends and pivot bearing means pivotally connecting the partitioning means to the pivot member about a second movable pivot axis perpendicular to and intersecting the first pivot axis at said geometric center of the spherical chamber.

9. The combination of claim 8 wherein said rotor includes a circumferential bearing portion journaled in the housing about said fixed diametrical axis, said pivot member being journaled about said first pivot axis by the bearing portion.

10. The combination of claim 8 wherein said partitioning means comprises a generally circular disc body to which the power shaft is connected and guide means peripherally mounted on the disc body for wiping engagement with the housing dividing the spherical chamber into hemispherical sections within which the cavities are formed.

11. The combination of claim 8 wherein said piston means includes piston bodies displaceable with the rotor relative to the partitioning means through predetermined strokes between end positions substantially abutting the partitioning means.

12. The combination of claim 10 wherein said rotor includes a circumferential bearing portion journaled in the housing about said fixed diametrical axis, said pivot member being journaled about said first pivot axis by the bearing portion and said piston bodies being secured to the bearing portion.

13. The combination of claim 1 wherein said piston means includes piston bodies displaceable with the rotor relative to the partitioning means through predetermined strokes between end positions substantially abutting the partitioning means.

14. The combination of claim 13 wherein said rotor includes a circumferential bearing portion journaled in the housing about said fixed diametrical axis, said piston bodies being secured to the bearing portion.

15. The combination of claim 1 wherein said rotor includes a circumferential bearing portion journaled in the housing about said fixed diametrical axis.

16. The combination of claim 1 wherein said partitioning means comprises a generally circular disc body to which the body shaft is connected and guide means peripherally mounted on the disc body for wiping engagement with the housing dividing the spherical chamber into hemispherical sections within which the cavities are formed.

17. In a fluid displacing device including a housing enclosing a spherical chamber having a geometric center, a drive axle rotatably mounted by the housing, a rotor rotatably mounted by the housing at a predetermined angle to said drive axle, and a partitioning element mounted within said chamber, the improvement comprising pivotal joint means within the chamber for pivotally interconnecting the partitioning element and the rotor about two movable pivot axes respectively fixed thereto and intersecting at a geometric center of the chamber in perpendicular relation to each other, said drive axle being fixed to the partitioning element, means respectively journaling the rotor and the drive axle in the housing about fixed axes intersecting at said predetermined angle on the geometric center of the chamber, port control means, said port control means rotatably mounted in the housing in enclosing relation to a chordal segment of the spherical chamber for controlling flow into and out of the chamber in response to rotation of the drive axle, and gear means within said spherical chamber drivingly connecting said drive axle to the port control means for imparting rotation thereto in response to rotation of said partitioning element whereby said port control means will rotate at ½ the speed of said drive axle.

18. The fluid displacing device of claim 17 wherein said gear means includes an annular gear mounted on said drive axle.

19. The fluid displacing device of claim 18 wherein said gear means includes planet pinions, said planet pinions joined to said port control means.

20. The fluid displacing device as claimed in claim 17 wherein said port control means defines a triangularly shaped port.

* * * * *

UNITED STATES PATENT AND TRADEMARK OFFICE
CERTIFICATE OF CORRECTION

PATENT NO. : 4,815,432

DATED : Mar. 28, 1989

INVENTOR(S) : Michael Sutton

It is certified that error appears in the above-identified patent and that said Letters Patent is hereby corrected as shown below:

Delete the title page and substitute the attached title page therefor.

Delete "Figs. 1 through 11" and insert the attached drawings containing Figs. 1 through 14.

Column 6, line 4, after "port", delete "845" and insert therefor --84--.

Signed and Sealed this

Twenty-sixth Day of December, 1989

Attest:

JEFFREY M. SAMUELS

Attesting Officer     Acting Commissioner of Patents and Trademarks

United States Patent [19]

Sutton

[11] Patent Number: 4,815,432
[45] Date of Patent: Mar. 28, 1989

[54] VARIABLE CAVITY FLUID POWER DEVICE

[76] Inventor: Michael Sutton, 5400 Audrey Rd., Greensboro, N.C. 27406

[21] Appl. No.: 214,854

[22] Filed: Jul. 5, 1988

Related U.S. Application Data

[63] Continuation-in-part of Ser. No. 191,760, May 3, 1988, abandoned, which is a continuation of Ser. No. 64,381, Jun. 22, 1987, abandoned.

[51] Int. Cl.⁴ .................. F02B 53/12; F02B 55/14; F01C 3/06
[52] U.S. Cl. .................. 123/241; 418/68; 418/143; 418/195
[58] Field of Search .................. 418/68, 195, 143; 123/241

[56] References Cited

U.S. PATENT DOCUMENTS

| | | | |
|---|---|---|---|
| 1,880,131 | 9/1932 | Gray | 418/68 |
| 2,043,544 | 6/1936 | Kempthorne | 123/241 |
| 2,173,663 | 9/1939 | Raymond | 123/241 |

FOREIGN PATENT DOCUMENTS

| | | | |
|---|---|---|---|
| 571920 | 2/1924 | France | 418/68 |
| 911618 | 3/1946 | France | 418/195 |
| 45-14470 | 5/1970 | Japan | 418/195 |
| 2052639 | 1/1981 | United Kingdom | 418/195 |

Primary Examiner—John J. Vrablik

[57] ABSTRACT

A piston rotor and a chamber partitioning rotor are continuously rotated unidirectionally about fixed rotational axes intersecting at an acute angle within a spherical chamber enclosed by a housing. Simultaneous rotation of the rotors and relative angular movement therebetween occurs because of a pivotal joint interconnecting such rotors at the intersection of the rotational axes coinciding with the geometric center of the spherical chamber. Pressure cavities formed between the rotors within the spherical chamber are volumetrically varied in response to the relative movement of the rotors. For internal combustion engine operation, port controlling dome segments within the chamber are rotated at a reduction drive ratio to the chamber partitioning rotor through planetary gearing.

20 Claims, 5 Drawing Sheets